United States Patent [19]

Eberle

[11] 4,255,873
[45] Mar. 17, 1981

[54] OPTIC ART KIT NOVEL EXTRUDED FRAME MATERIAL

[76] Inventor: William J. Eberle, 2406 Wassner Dr., Reading, Pa. 19609

[21] Appl. No.: 16,107

[22] Filed: Feb. 28, 1979

[51] Int. Cl.³ .............................................. G09F 13/18
[52] U.S. Cl. ...................................... 434/82; 40/546; 434/428
[58] Field of Search .............. 40/10 D, 546, 547, 549, 40/616; 273/DIG. 14, DIG. 16; 35/26, 27, 66, 58, 59, 65; 206/575; 156/658

[56] References Cited

U.S. PATENT DOCUMENTS

| | | | |
|---|---|---|---|
| 1,097,922 | 5/1914 | Feraud | 40/546 X |
| 1,843,980 | 2/1932 | Hotchner | 35/58 X |
| 1,992,083 | 2/1935 | McDonald | 35/26 |
| 2,634,530 | 4/1953 | Herschede | 40/546 |
| 2,906,048 | 9/1959 | Kraus | 40/546 X |
| 3,363,341 | 1/1968 | Glassman | 35/65 |
| 3,501,362 | 3/1970 | Walker | 35/26 X |
| 3,591,941 | 7/1971 | Jaffe | 40/546 |

FOREIGN PATENT DOCUMENTS 11112  5/1909  United Kingdom ...................... 40/546

OTHER PUBLICATIONS

Pearson, "Piping Light with Acrylic Materials", pp. 123–127, of Aug. 1946, Modern Plastics, vol. 23, No. 12, Fluorescent Lamps, p. 1144 of 1963 Montgomery Ward Fall–Winter Catalog.

Primary Examiner—Harland S. Skogquist
Attorney, Agent, or Firm—Benasutti Associates, Ltd.

[57] ABSTRACT

An optic art kit is disclosed comprising one or more pieces of a pre-cut frame material (a section of which is constructed with an internal light source), a sheet of abradable material, a one scriber having engraving and abrasive portions, several triangular supports for free-standing assembly, and line drawings or other pictorial material for use as a pattern when abrading the sheet material. The pre-cut frame material is extruded from plastic and has a flat base, substantially perpendicular side portions and rounded top portions which terminate in parallel spaced apart clamping flanges which engage opposing sides of the sheet material. This frame material is preferably mitered so that it may adhere to all the edges of the sheet material to frame the sheet or, alternatively, to cooperate with one or more triangular supports to create a freestanding assembly. The resulting kit produces a professional, attractive edge-lit product which may be used for decoration or to provide information.

15 Claims, 3 Drawing Figures

OPTIC ART KIT NOVEL EXTRUDED FRAME MATERIAL

BACKGROUND OF THE INVENTION

The present invention relates generally to the field of edge-lit items, and more particularly to the field of edge-lit items which are intended to be made in the home and used for decoration around the home, as for example, as a crafts project.

It has long been known that various materials, such as acrylic sheet, can be edge-lit by a light source, and that if the material is scratched or otherwise abraded, the light which is transmitted through the sheet will be projected out of the face of the sheet. Heretofore, housings for light sources associated with said sheets have been bulky and expensive. The preparation of the edge-lit items has been accomplished mainly by professional artists who engrave those items using relatively sophisticated techniques. No readily convenient method or kit has been known to the art which would enable a novice to produce and assemble a pleasing optic display.

SUMMARY OF THE INVENTION

The present invention provides a novel optic art kit and method for fabricating same which represents a substantial advance over that heretofore known.

The preferred kit comprises a pre-cut frame material which is extruded and is cut into sections with mitered ends. Installed within at least one section is a cylindrical light source, such as a fluorescent tube, which is wired to a remotely disposed ballast and plug for a conventional wall outlet. The frame material comprises a substantially planar base having two parallel, upwardingly extending side portions which are joined to curved portions which converge in radii concentric with the longitudinal axis of the light source surrounded by that frame material. Two parallel, spaced apart flanges, which are normally spaced apart by approximately 1/32 of an inch less than the thickness of the sheet material to be received therebetween, are formed at the tips of the curved portions. The configuration of the frame material facilitates the sliding reception of the cylindrical light source and retention of the sheet material. Two channels adjacent to the light source and two readily accesible spaces at the end of the light source are additionally created to receive the required light source wiring. Additionally, acceptance and retention of transparent, colored gel material (between the flanges and sheet material edge) for altering the color of light which is transmitted through the sheet is facilitated. The frame material may also receive more than one layer of sheet material as for example when a backing is to be used, together with the acrylic sheet, or, during fabrication, so that a pattern sheet may be held adjacent to the acrylic sheet during an abrading operation, as more fully described hereinafter.

In the preferred embodiment, the optic art kit of the present invention includes not only the aforementioned pre-cut frame material, but also a piece of cell-cast acrylic sheet (having its normal adhesive paper protections), a scriber having engraving and abrasive portions, triangular supports for freestanding assembly, and line drawings or other pictorial material to serve as patterns and/or backdrops for use during and/or upon completion of the art work.

The kit is preferably completed by its user according to the following method in order to produce a pleasing art work; first, the protective adhesive paper covering is removed from both sides of the sheet material and the sheet is fitted for engagement by the pre-cut frame material portion which has been preassembled with a light source. In the case where pattern drawings or other pictorial material has been supplied (appropriately sized with respect to the acrylic sheet to be worked), those drawings are also fitted into at least the illuminating frame section so that they are "sandwiched" against the acrylic sheet during the following working operations. Alternatively, the acrylic sheet is placed over and/or against the pictorial material to be traced, preferably by laying the material on a flat surface and allowing the illuminating frame portion to hang over one edge of that surface. The illuminating frame portion is then activated to light the acrylic sheet, and the scriber is utilized to conform the desired portions of the acrylic sheet to the underlying pattern or pictorial material. In the preferred embodiment, the scriber comprises a mechanical-pencil type housing which has been fitted in one end with an engraving point, such as a hardened steel needle, and in the other end with a highly abrasive material, such as an ink eraser, which together will readily produce well defined lines and shadings, respectively. Once the picture has been conformed to the underlying material in the desired manner, the pattern or underlying material may be removed and a suitable backing substituted therefore, if desired. The remaining frame sections or the triangular supports may then be applied to the acrylic sheet material. If the remaining frame sections are selected, each frame section is applied along an edge of the sheet to produce a fully framed art work which is illuminated by a fully concealed illuminating means along one edge. Alternatively, if the triangular supports are applied to the sheet material, these supports are fitted along the mitered edges of the pre-cut frame material to engage either side of the acrylic sheet and to form a stand which, together with the base portion of the frame, permit the art work to be placed in freestanding locations. Once connected to a suitable power supply at the desired display location, by touching a momentary contact switch associated with the illuminating frame portion, the work will be pleasingly illuminated by a concealed source for public display.

If desired, the tone or color of the work may be changed simply by fitting a colored flexible gel-type material over the edge of the acrylic sheet which is adjacent to the fluorescent light and slipping the sheet and portions of the gel extending over opposing surfaces thereof between the gripping flanges of the frame material.

Accordingly, a primary object of the present invention is the provision of a novel optic art kit.

A further object of the present invention is the provision of a low cost, frame material particularly adapted for receiving a fluorescent light source and for engaging and retaining acrylic sheet material to be edge-lit thereby.

A further object of the present invention is the provision of a novel crafts kit and method particularly suited for home construction and decorative display.

These and other objects of the present invention will become apparent from the following more detailed description.

DETAILED DESCRIPTION OF THE DRAWINGS

Figure 1:
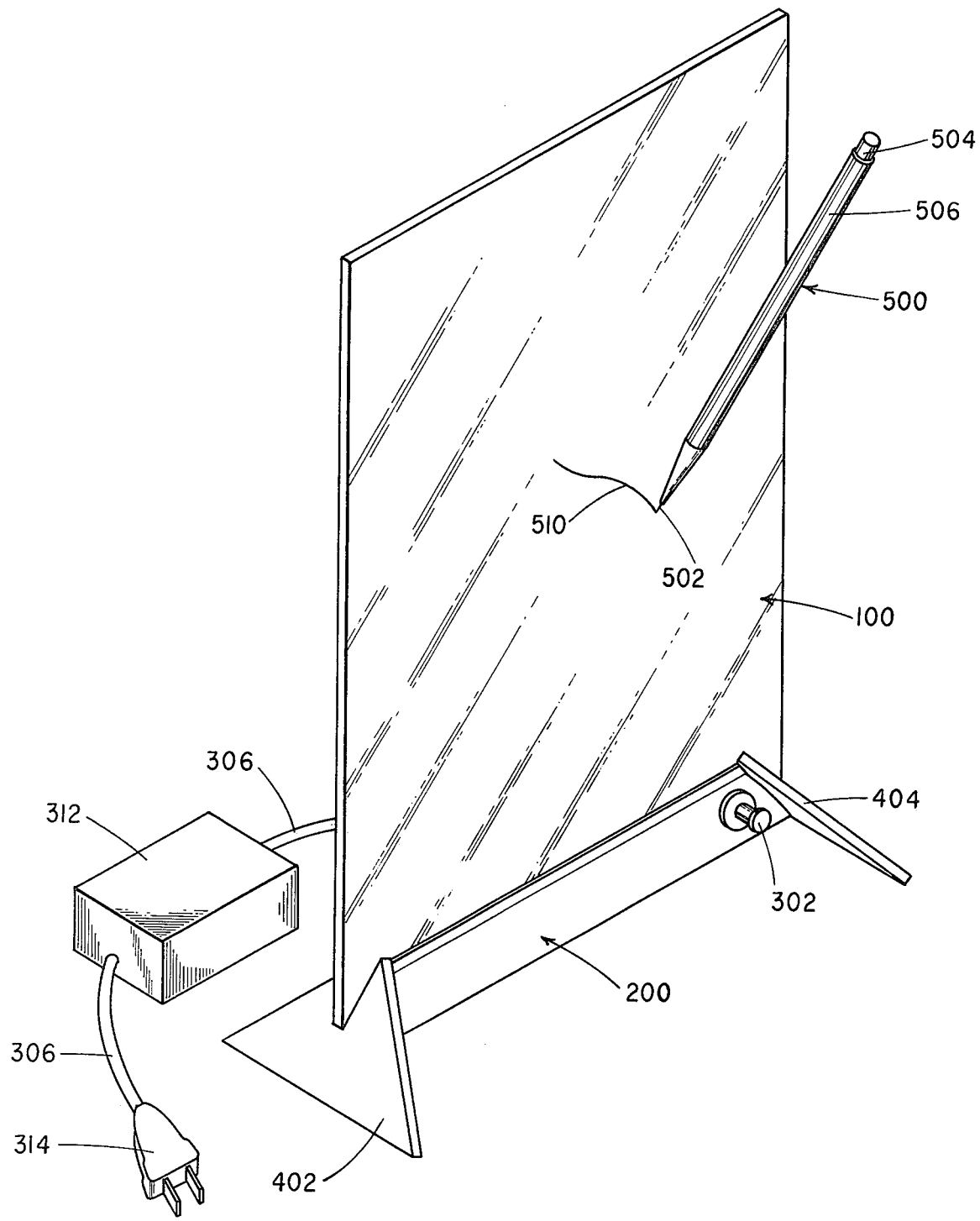
FIG. 1 is an isometric view of a freestanding preferred embodiment of the present invention illustrating the marking of the acrylic sheet with the preferred embodiment scriber and showing the triangular portions fitted in place at either end of a single illuminating frame section.

Although specific forms of the invention have been selected for illustration in the drawings, and the following description is drawn in specific terms for the purpose of describing these forms of the invention, this description is not intended to limit the scope of the invention which is defined in the appended claims.

Referring now to the figures, and particularly FIG. 1 which shows a freestanding embodiment of the present invention, the freestanding unit will be seen to comprise a light transmitting, abradable sheet material, designated generally 100, which is fitted into and engaged by a portion of the framing means designated generally 200. An illumination means including a substantially cylindrical light source, such as a fluorescent bulb, is substantially surrounded and mounted within the framing means designated generally 200, which also receives and retains at least an edge of the sheet material in close proximity to the illumination means to substantially continuously illuminate the edge of the sheet when the display is turned on. The illumination means for transmitting light to the sheet generally comprises a substantially cylindrical light source 304 (shown in FIG. 3) which slidably engages the interior of a frame section. In the preferred embodiment, this light source is a fluorescent bulb, as for example, a four, six, or eight watt bulb, an eight watt bulb being preferred. As seen in FIG. 3, two wires 308 and 310 which are connected to the conventional prongs at one end of the bulb extend back along the bulb in basal channels which are formed between the bulb and adjacent to the intersection between the base 210 and side portions 212 and 214 of the frame section 202. The illumination means also comprises a momentary contact switch 302 (shown in FIGS. 1 and 2) which is mounted through a side wall 212 or 214 of the frame section between the end of the bulb and the end of the frame section. In the preferred embodiment, for example, a conventional eight watt fluorescent bulb (which is ten inches long), is used in an illuminating frame section which is mitered to be twelve inches long, thereby leaving a one inch substantially triangular clearance area at each end of the bulb within the frame section wherein wiring may be accomplished. These areas are quite accessible through the ends of the frame section. One of the wires 308 or 310 is wired in series through the momentary contact switch 302 to a wire (not shown) which extends to one of the prongs at the other end of the fluorescent bulb. The other of wires 308 and 310 and a wire not shown extending from the other prong of the switch end of the fluorescent bulb, connect to a line cord 306 which extends to a remote fluorescent ballast 312, and then to plug 314. When it is desired to eliminate the fluorescent bulb, therefore, the plug 314 should be connected to a conventional socket and the momentary contact switch 302 temporarily depressed to form a starter for the fluorescent bulb.

Figure 2:
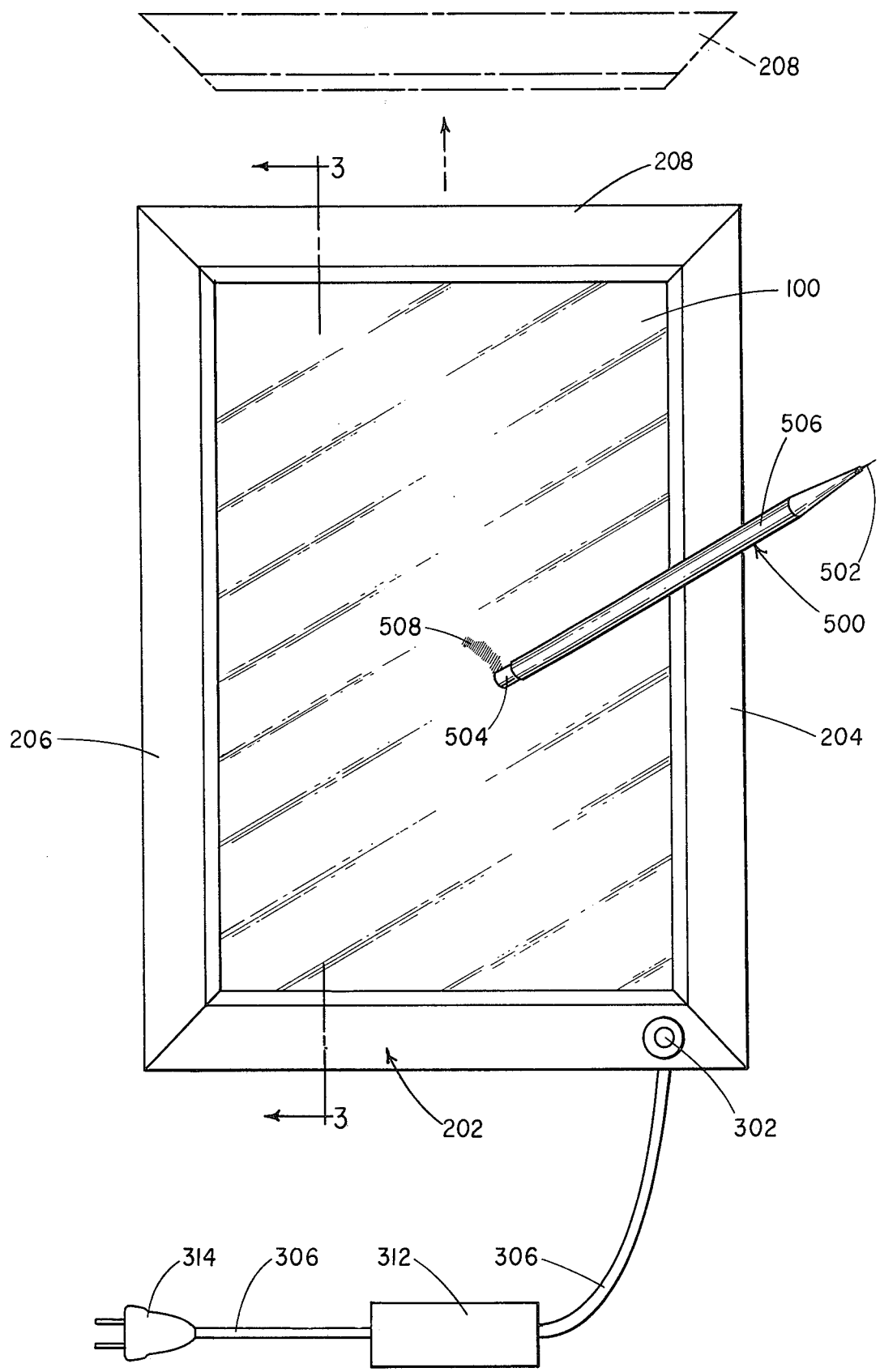
FIG. 2 is a front view of the fully framed preferred embodiment of the present invention showing the preferred embodiment scriber shading a portion of the acrylic sheet, and further showing a non-illuminating frame section exploded away in phantom outline from the top of the acrylic sheet.
Figure 3:
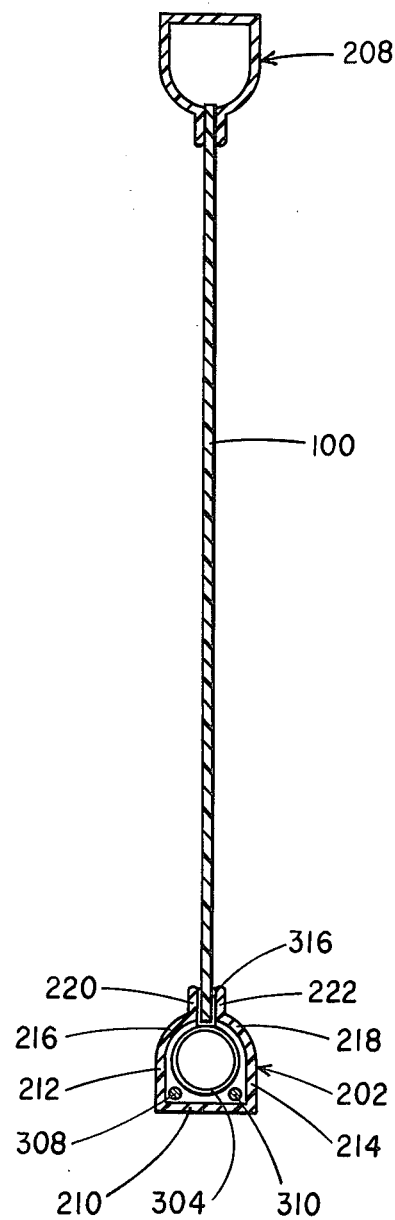
FIG. 3 is a cross-section of the embodiment shown in FIG. 2 taken as indicated by the lines and arrows 3—3 in FIG. 2.

The framing means comprises one or more frame sections, such as sections 202, 204, 206, and 208 shown in FIG. 2, each of which frame sections have identical cross-sections. In the preferred embodiment, these frame sections are extruded in long lengths through a single extrusion die, and then are mitered into appropriate sections for inclusion in the preferred embodiment kit. In FIG. 3, the preferred cross-section is illustrated, clearly showing a substantially flat base portion 210 and substantially planar, perpendicularly extending side walls 212 and 214 which are joined at their remote ends to converging, curved portions 216 and 218 which terminate in spaced apart substantially parallel flanges 220 and 222. In the preferred embodiment, the framing material is extruded from a thermoplastic material, such as polypropylene, polyethylene, polystyrene and/or various copolymers thereof. In particular, it is believed that this framing material may be advantageously extruded from re-ground battery case material, which material is basically an ethylene-propylene copolymer.

As seen in FIG. 3, the dimensions of the various portions of the framing material are carefully selected with respect to the bulb diameter and sheet material thickness. The width of the base portion, as measured between the interior surfaces of the side walls 212 and 214 is slightly greater than the outside diameter of the cylindrical light source 304. (As used in the specification, the terms "slightly greater" or "slightly less" shall mean an amount from one to twenty percent greater or less, respectively). Similarly, the length of the side wall portions 212 and 214 are slightly greater than the radius of the cylindrical light source, whereas the curved portions 216 and 218 define arcs which are concentric with respect to the longitudinal axis of the cylindrical light source 304. Similarly, parallel, spaced apart flanges 220 and 222 are symmetrically disposed with respect to the axis of the cylindrical light source 304, and more particularly, with respect to a plane which is perpendicular to base portion 210 and which intersects the longitudinal axis of the substantially cylindrical light source 304. In this manner, an edge of sheet material 100 is engaged and held in close proximity to the surface of cylindrical light source 304, with its lower edge substantially parallel to the outer surface of its contiguous portion of the light source, to thereby maximize the amount of light which is transmitted into the sheet 100. In its normal state, the opening defined between the flanges 220 and 222 is approximately 1/32 of an inch less than the thickness of the sheet material (preferably ⅛ inches thickness) to be engaged therebetween, plus or minus 0.015 inches. In the preferred embodiment, the bulb diameter is ⅝ of an inch plus or minus 0.020 inches.

In the alternate embodiment shown in FIG. 3, extremely thin flexible "gel" material 316 may be wrapped in a U-shaped configuration over the end of sheet 100 to be retained in place by the flanges 220 and 222, which gel material 316 will impart a color to the light transmitted therethrough. Accordingly, depending on the nature of the display to be accomplished, the entire sheet or only portions of the edge thereof may be lit in colors.

In accordance with the preferred embodiment shown in FIG. 1, the optic art kit of the present invention is provided with an abrading means altering the light transmitting characteristics of the surface of the sheet material. This is made possible due to the selection of the sheet material which may be mechanically abraded, and which abraded areas will act to convert internally transmitted light within the sheet outwardly to a viewing area. In the preferred embodiment, acrylic sheet material, particularly cell cast acrylic sheet material, similar to materials sold by the Rohm and Haas Company under the trademark "PLEXIGLAS," is suitable for this purpose. In the preferred embodiment, the abrading means comprises the body of a mechanical pencil 506 having an abrasive means 504 mounted on one end and an engraver 502 mounted at the other in place of a conventional lead. As seen in FIG. 1, the use of the engraver 502, which is preferably a hardened needle, will cause lines, such as line 510 to appear on the face of the acrylic sheet material 100. As shown in FIG. 2, the use of the abrasive means, which may be an ink eraser, will produce a shading, such as shading 508, on the surface of the acrylic sheet material 100. By combining these two effects, pleasing artistic drawings and/or other visually perceptible representations may be produced on the sheet. In FIG. 1, the sheet material is shown displayed in its freestanding form, wherein a single section of framing material 200 has been fitted at either end by triangular support brackets 402 and 404 which are slotted to slip over and engage opposing surfaces of the sheet material, and to rest against the mitered end ends of the frame section 200. In the manner, a stable freestanding display is produced.

Referring now to FIG. 2, a completely framed form of display is illustrated wherein frame section 208 is broken away in phantom for purposes of illustration. For the embodiment illustrated in FIG. 2, numerous frame sections 202, 204, 206, and 208 are provided which together may be placed around the acrylic sheet 100 to form a continuous self-adhering frame. In addition to the momentary contact switch 302 illustrated in the drawings, a second normally closed switch which may be momentarily open may be provided on the opposite end of the frame section containing the substantially cylindrical light source. In this instance, the normally closed circuit to that light source will be wired through that normally closed switch, so that when it is desired to turn off the light source that normally closed switch may be touched to open the circuit to deactivate the light source.

The use of a somewhat elastomeric extruded frame material also permits the use of sheet material comprising several laminations, such as backing materials, background scenes, multiple gels or other laminations which may be used in accordance with the methods described above to accomplish an extremely pleasing overall artistic effect.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the U.S. Patent and Trademark Office, and is not intended to limit the scope of the invention described and claimed herein.

What is claimed is:

1. An optic art kit comprising:
   (a) a light transmitting, abradable sheet material;
   (b) fluorescent illumination means for transmitting light to the edge of said sheet, said fluorescent illumination means being cylindrical and having a remote ballast, and
   (c) an extruded framing means having a base of sufficient length to mount said illuminating means thereon, a width slightly greater than the outside diameter of said illuminating means, sidewalls extending along the lengthwise edge of said base, said sidewalls having a length slightly greater than the radius of the illuminating means, arcs depending from said sidewalls and remote from said base, said arcs being concentric with respect to the longitudinal axis of said fluorescent illumination means and extending inwardly from the planes defined by said sidewalls, and vertically disposed flanges extending from the free ends of said arcs substantially parallel to said sidewalls, for substantially surrounding said fluorescent illumination means and for receiving and retaining said sheet in close proximity to said fluorescent illumination means.

2. The invention of claim 1 wherein said kit further comprises abrading means for altering the light transmitting characteristics of the surface of said sheet.

3. The invention of claim 2 wherein said abrading means further comprises engraving means for scribing into said surface and abrasive means for roughening said surface, whereby, when edge illuminated, said engraving means defines lines in said surface and said abrasive means defines shading on said surface.

4. The invention of claim 3 wherein said abrading means comprises the body of a mechanical-pencil fitted at one end with a hardened needle and at the other with an eraser material.

5. The invention of claim 1 wherein said flanges are parallel and symmetrically disposed with respect to a plane which is perpendicular to said base portion and intersects the longitudinal axis of said fluorescent illumination means.

6. The invention of claim 5 wherein said flanges are normally spaced apart by a distance less than the thickness of said sheet.

7. The invention of claim 6 wherein said frame is extruded from a thermoplastic material.

8. The invention of claim 7 wherein said thermoplastic material is re-ground, plastic battery case material.

9. The invention of claim 8 wherein said framing means comprises a plurality of frame sections of identical cross-sections, each of which sections is mitered to form a continuous self-adhering frame when applied to the sides of an appropriately sized piece of said sheet material.

10. The invention of claim 8 wherein said kit further comprises support means for engaging ends of said framing means and portions of opposing surfaces of said sheet material, for facilitating freestanding display of edge-lit sheet material.

11. The invention of claim 10 wherein said support means comprises at least one substantially triangular piece of said sheet material, said piece being slotted to slidingly receive at least a portion of said sheet material to receive edge lighting from said fluorescent illumination means.

12. The invention of claim 1 wherein said fluorescent illumination means and said remote ballast are electrically interconnected by conduit means and switch means.

13. The invention of claim 12 wherein said conduit means comprises at least two conduits extending longitudinally along the length of said fluorescent illumination means, within spaced apart basal conduit channels defined between said fluorescent illumination means and portions of the interior surface of said framing means.

14. The invention of claim 12 wherein said switch means comprises a normally open, momentary contact switch mounted between an end of said fluorescent illumination means and an end of a portion of said framing means.

15. The invention of claim 12 wherein said switch means comprises a normally closed, momentarily openable, switch mounted between an end of said fluorescent illumination means and an end of a portion of said framing means.

* * * * *